US007695062B2

(12) United States Patent
Stöwe

(10) Patent No.: US 7,695,062 B2
(45) Date of Patent: Apr. 13, 2010

(54) DEVICE FOR RECEIVING FUNCTIONAL ELEMENTS

(75) Inventor: Stefan Stöwe, Mering (DE)

(73) Assignee: W.E.T. Automotive Systems AG, Odelzhausen (DE)

( * ) Notice: Subject to any disclaimer, the term of this patent is extended or adjusted under 35 U.S.C. 154(b) by 192 days.

(21) Appl. No.: 10/549,517

(22) PCT Filed: Mar. 17, 2004

(86) PCT No.: PCT/DE2004/000540

§ 371 (c)(1),
(2), (4) Date: May 9, 2006

(87) PCT Pub. No.: WO2004/082989

PCT Pub. Date: Sep. 30, 2004

(65) Prior Publication Data

US 2006/0267260 A1    Nov. 30, 2006

(30) Foreign Application Priority Data

Mar. 17, 2003   (DE)   ................................. 103 11 861
Jun. 10, 2003   (DE)   ............................. 203 20 371 U

(51) Int. Cl.
*A47C 7/72* (2006.01)
*A47C 7/02* (2006.01)

(52) U.S. Cl. ............................... 297/180.1; 297/180.12; 297/452.42; 297/452.44; 5/421; 5/724

(58) Field of Classification Search ............ 297/180.12, 297/180.13–180.14, 452.42–452.44; 5/716, 5/642, 654.1, 655.7, 421, 724
See application file for complete search history.

(56) References Cited

U.S. PATENT DOCUMENTS

| 1,541,213 | A |   | 6/1925  | Harley |
| 2,922,466 | A | * | 1/1960  | Marston ................. 297/452.43 |
| 2,992,604 | A |   | 7/1961  | Trotman et al. |
| 3,576,040 | A | * | 4/1971  | Larsen ......................... 267/83 |
| 4,997,230 | A | * | 3/1991  | Spitalnick .............. 297/180.11 |
| 5,002,336 | A | * | 3/1991  | Feher ..................... 297/180.13 |
| 5,934,748 | A | * | 8/1999  | Faust et al. ............ 297/180.12 |
| 6,229,123 | B1 | * | 5/2001 | Kochman et al. ........... 219/549 |
| 6,291,803 | B1 | * | 9/2001 | Fourrey ...................... 219/497 |
| 6,578,910 | B2 | * | 6/2003 | Andersson et al. ..... 297/180.11 |
| 6,988,770 | B2 | * | 1/2006 | Witchie ................. 297/180.14 |
| 2002/0145312 | A1 | * | 10/2002 | Gielda et al. .......... 297/180.13 |
| 2004/0036325 | A1 | * | 2/2004 | Diemer et al. ......... 297/180.12 |
| 2004/0104607 | A1 | * | 6/2004 | Minegishi et al. ...... 297/180.14 |
| 2007/0158981 | A1 | * | 7/2007 | Almasi et al. .......... 297/180.12 |

FOREIGN PATENT DOCUMENTS

DE          102 28 406 A1        1/2003

* cited by examiner

*Primary Examiner*—Sarah B McPartlin
(74) *Attorney, Agent, or Firm*—Dobrusin & Thennisch PC

(57) ABSTRACT

A device (2) for accommodating functional elements in regions of a motor vehicle interior that are subjected to mechanical forces at least at times, having a base layer (8), an intermediate layer (10) and a cover layer (12), wherein the layers (8, 10, 12) are arranged so as to at least partially overlap one another, wherein the intermediate layer (10) has at least one support element (14) for the transmission of mechanical loads between the base layer (8) and cover layer (12), which element is made, in particular, of a firm but flexible material. In addition to the support element (14), additional functional elements (18) are arranged in the remaining space (16) between the base layer (8), the cover layer (12) and the support element (14).

18 Claims, 12 Drawing Sheets

FIG. 8
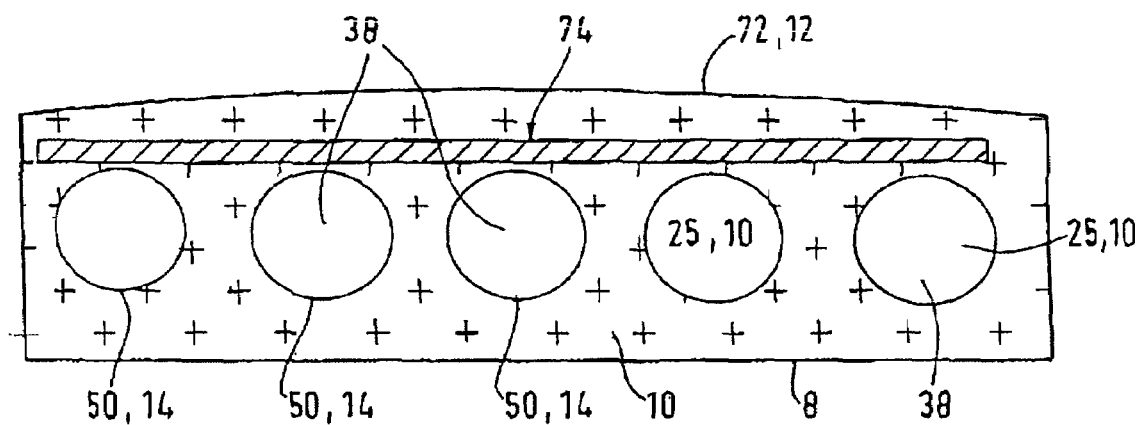
FIG. 9
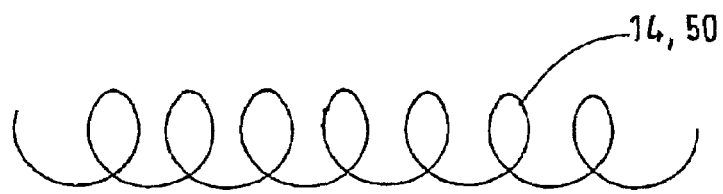
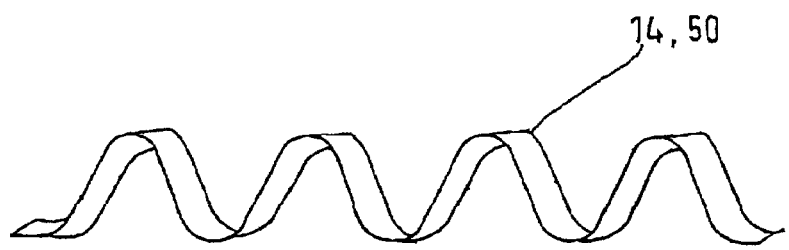
FIG. 10

FIG. 16
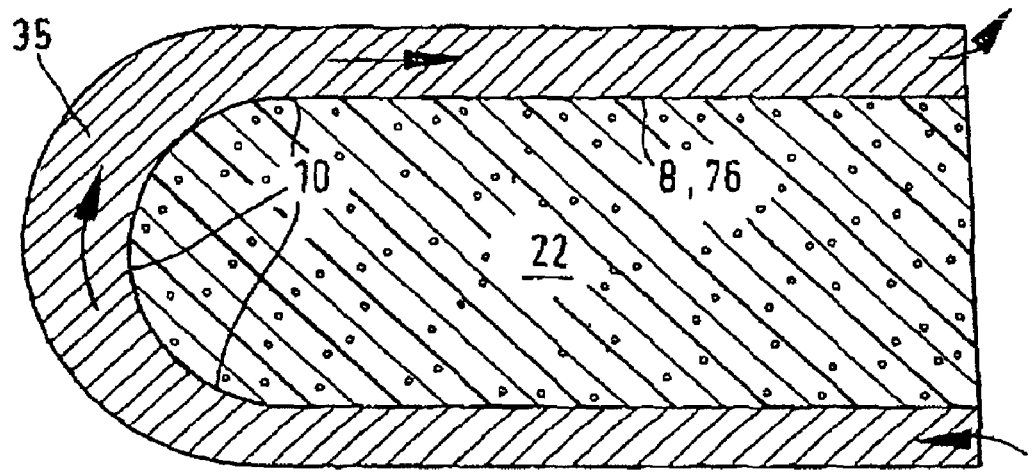
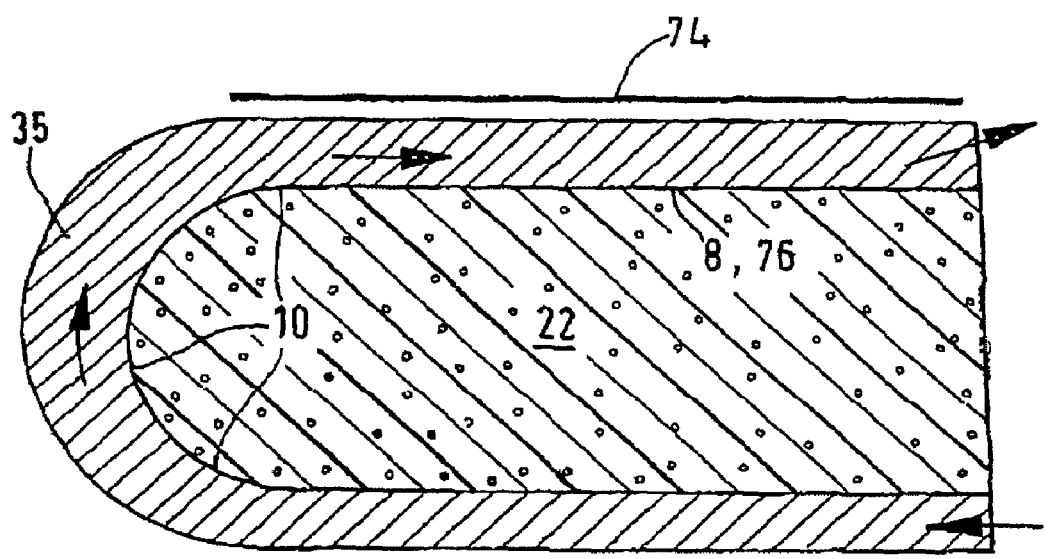
FIG. 17

DEVICE FOR RECEIVING FUNCTIONAL ELEMENTS

The present invention concerns a device for accommodating functional elements in regions of a vehicle interior that are subject, at least at times, to mechanical forces. The device includes a base layer, an intermediate layer and a cover layer. The layers are arranged so as to at least partially overlap one another. The intermediate layer has at least one support element for the transmission of mechanical loads between the base layer and cover layer. Such functional elements can be, in particular, cushion or trim elements of a motor vehicle interior and, more particularly, of a vehicle seat.

BACKGROUND

Known from U.S. Pat. No. 1,541,213 and from U.S. Pat. No. 2,922,466 are seat cushions in which a plurality of coils arranged next to one another in a single plane form a spacer layer between the seat and the user. This is intended to prevent excessive sweating on the part of the user. No actual control of moisture transport is provided herein.

Known from U.S. Pat. No. 2,992,604 is a seat cushion that can be separated from the seat in which air is moved by a fan and blown into a coil pad resting on the seat. In colder weather, especially in winter, however, such cushions must be removed to make it possible to activate an existing seat heater. Otherwise the seat cushion would screen the passenger from the heat produced by the seat heater to an excessive degree, thus rendering the heater largely ineffective.

It is known from DE 102 28 406 A1 to incorporate a heating conductor into plastic coils in order to heat a seat. However, the efficiency of such an arrangement is relatively limited since the distance to the passenger located on the seat is very great.

SUMMARY OF THE INVENTION

It is considered an object of the present invention to create alternative devices for accommodating functional units in regions of a vehicle interior subjected to mechanical forces.

The present invention provides a device for accommodating functional elements in regions of a vehicle interior that are subject to mechanical loads, at least at times. The device includes a base layer, an intermediate layer and a cover layer. The layers are arranged so as to at least partially overlap one another. The intermediate layer has at least one support element for the transmission of mechanical loads between the base layer and cover layer. In addition to the support elements, additional electrical functional elements are arranged in a space between the base layer, functional layer and the support element.

A device according to the invention for accommodating functional elements in regions of a vehicle interior that are subjected to mechanical forces at least at times provides that, in a region or in a remaining space between a base layer, a cover layer and a support element of the device, additional, and in particular electrical, functional elements are arranged. The device according to the invention can be arranged, in particular, in a vehicle seat, a door trim panel, or a dashboard. The device according to the invention can likewise be another trim element and/or cushion element in the vehicle interior. The design according to the invention results in very diverse and universal possibilities for the design of the device as well as diverse possibilities for application and use.

One embodiment of the invention provides that the vehicle seat has a cushion core to support a passenger and a device for climate control of the vehicle seat. In particular, provision can be made that the device according to the invention is joined material-to-material to the cushion core of the vehicle seat.

An advantageous embodiment of the invention can provide the device with air distribution devices or layers. Thus, for example, an upper air distribution device can be provided at a front side of a cushion core facing the passenger and a lower air distribution device can be provided at a rear side of the cushion core facing away from the passenger. In addition, a connecting device to transfer air between the first and second air distribution layers can be present, for example in the form of an air duct or in the form of multiple air ducts. At least one of the three said devices (upper and lower air distribution devices, connecting device) can have an elongated hollow space. This elongated hollow space is preferably formed of at least parts of the intermediate layer. Furthermore, provision can be made that at least one support element is provided in the air-conducting cross-section of the hollow space.

In a first variant of the invention, the functional element can be a sensor that in particular can be arranged directly under the support element. The sensor can, for example, serve to detect pressure, temperature, distance, moisture, acceleration, airborne sound or structure-borne sound, for example vibrations.

According to another variant of the invention, the functional element can be a conducting device, in particular an optical waveguide, a flat cable, a round cable, a heating conductor, a pneumatic line or a fluid-carrying hose. Possible fluids include, for example, coolant and the like. The functional element can optionally also be an actuating device, for example a massage device, an operating element, an adjustment device or a thermostat.

The functional element can optionally also be a passive non-electrical device, particularly a shaped or free-form filler. The filler can in particular have heat-insulating materials such as polystyrene or moisture-absorbing materials such as activated carbon. The filler can in particular have textile or textile-like components such as wool, natural fibers, recycled foam waste and/or rubberized hair, and in particular can have a flocked or granular form or the like.

In accordance with one embodiment of the invention, the support element can have a spring, in particular preferably a spring coiled in a spiral or meandering shape, which can in particular comprise or be made from a band-shaped plastic material. Provision can be made that the support element 14 is made of a firm but flexible material. The support element preferably includes multiple springs on a supporting layer that carries them, a spacer textile with a large air volume that is kept open, a foam with a surface structure that in particular has a napped profile and/or a rubberized hair mat with bristles or made from or with, for example, a nonwoven material.

If necessary, the support element can additionally have a moisture-storing surface, in particular through dusting or coating with activated carbon or the like.

Another preferred embodiment of the invention provides that the device is connected to at least one ventilating device that serves to convey air through the intermediate layer. The transfer of air from the ventilating unit into the device according to the invention can, in particular, be perpendicular to or flush with the intermediate layer. The transfer of air preferably takes place into a region of the intermediate layer having increased layer thickness. Moreover, it is preferred that the transfer of air takes place into a region of the intermediate layer which has a thickened, round cross-section at one end and preferably has a flat, widened cross-section at the other end.

The ventilating device can, in particular, be connected to the front side of the cushion core facing the passenger. However, if desired, the ventilating device can also be connected at the rear side of the cushion core facing away from the passenger.

The connecting device can preferably have at least one recess in the cushion core, which in particular can be arranged vertically. The recess in the cushion core is preferably connected to the intermediate layer of the upper air distribution device and/or the intermediate layer of the lower air distribution device, in such a manner as to permit the passage of air.

At least a portion of the intermediate layer can be routed around the cushion core at the side thereof from its front side to its rear side. A conducting device can preferably be accommodated in this part of the intermediate layer. It can also be advantageous for the part of the intermediate layer to be located on the side of the cushion core that faces the hollows of the passenger's knees and/or the seat back.

Another preferred variant of the invention provides that the device has multiple recesses in the cushion core which preferably connect multiple individual sections of the intermediate layer arranged on the cushion core, and/or the upper air distribution device, to the intermediate layer arranged under the cushion core and/or to the lower air distribution device. The multiple individual sections are preferably separated from one another and spaced apart.

A textile layer, in particular, can be considered for the base layer. This textile layer of the base layer can in particular have a nonwoven mat, a foam and/or a film. The base layer is preferably thick enough to prevent support elements and/or functional elements from showing through. Furthermore, the base layer can at least in part be translucent or transparent. Moreover, it can be advantageous if the base layer is impermeable to water vapor and water-resistant. The base layer can, for example, be composed of the cushion core of the motor vehicle seat, a region of the intermediate layer that has increased density, a seat cover, and/or a planar heating element.

A textile layer, in particular, can also be considered for the cover layer. This textile layer of the cover layer can in particular have a nonwoven mat, a foam and/or a film. The cover layer is preferably thick enough to prevent support elements and/or functional elements from showing through. Furthermore, the cover layer can at least in part be translucent or transparent. Moreover, it can be advantageous if the cover layer is impermeable to water vapor and water-resistant. The cover layer can, for example, be composed of the cushion core of the motor vehicle seat, a region of the intermediate layer that has increased density, a seat cover, and/or a planar heating element.

According to another preferred embodiment of the invention, the base layer is joined to the cushion core in a material-to-material fashion. The inventive device can in particular be joined to the cushion core by foam molding during the manufacture thereof.

The intermediate layer and/or the base layer can in particular have a layer that is essentially impermeable to liquids and is arranged on the side of the intermediate layer facing the cushion core, said intermediate layer preferably consisting of the same material as the cushion core. Polyurethane in particular comes into consideration as a material for this layer and the cushion core. The liquid-impermeable layer can essentially constitute the base layer.

Furthermore, the base layer and/or the cover layer can have recessed and/or raised surface regions. In particular, channel-like regions can be formed in this way. At least some of the support elements can be arranged in a recessed surface region. Preferably, all support elements are arranged in recessed surface regions. In this case, the raised surface regions preferably have approximately the same height level as the recessed regions with support elements.

The inventive device and/or parts thereof can be placed in recesses in the cushion core and can be fastened there, for example, by adhesive joins, hooks, hook-and-loop fasteners, or similar means.

Another variant of the invention provides that the planar electric heating element is arranged on or in the intermediate layer, the base layer, and/or the cover layer. In particular, the heating element can constitute one of these three said layers. The planar electric heating element can preferably have an electrically heatable textile that is preferably arranged on the side of the intermediate layer facing the passenger. The electrically heatable textile material of the heating element can, in particular, have carbon fibers and/or an electrically conductive film and/or at least one stranded heating wire laid or arranged in a meandering shape.

In addition, a conductor, in particular a heating conductor, can be provided which is arranged in particular in at least one intermediate space between at least two support elements in the intermediate layer, or, in particular, is arranged in an intermediate space formed by a support element in the intermediate layer.

A plurality of elongated, in particular essentially parallel, intermediate spaces can be formed by the support elements. A heating conductor, preferably an insulated heating conductor, can be arranged in at least two such intermediate spaces. The heating conductor can optionally be fastened to the device, in particular to the base layer and/or the cover layer at the transition of said heating conductor from one intermediate space to the other intermediate space. This fastening of the heating conductor can, for example, be composed of a strip of adhesive material, which is arranged in particular essentially perpendicular to the intermediate spaces.

The intermediate layer and the planar heating element can be laminated together, wherein an adhesive mat can serve as a support. Moreover, support elements which are made at least in part of a thermoplastic material can be fused on and joined to the heating element, in particular by pressing.

Another embodiment of the invention provides that the cushion core likewise has at least one support element. The cushion core can in particular be composed essentially of a plurality of support elements.

Switching on of the heating element and/or of the heating conductor can cause air to flow along and in the intermediate layer. Such an airflow in the intermediate layer can also be induced by other means of heating the seat, in particular by solar radiation or by a passenger located on the seat.

Additional functional elements, even mechanically sensitive or stiff functional elements, may be placed in the free space within each of the support elements or between multiple support elements without suffering damage or bothering the passenger. Use of the invention can increase the efficiency of existing seat heating elements with regard to the time response characteristics (sensation of heat), heat distribution, and regulation of temperature. The invention permits highly automated manufacture of planar heating elements of variable design. As a result of the ventilation, the response characteristics of the heating can be improved still further. As a result of the PTC semiconductor components as heating components, the product includes the function of an independent overtemperature protection or independent temperature regulation with no additional electronic controller. PTC stands for positive temperature coefficient. A PTC conductor is thus a PTC thermistor or a conductor whose electrical resistance increases with increasing temperature.

BRIEF DESCRIPTION OF THE DRAWINGS

The invention is described in detail below on the basis of preferred example embodiments with reference to the attached drawings. These show:

FIG. 8 shows a cross-sectional view of another structural variant of the cushion core.

FIG. 9 shows a perspective view of a first embodiment of a support element.

FIG. 10 shows a perspective view of another embodiment of a support element.

FIG. 16 shows a schematic representation illustrating an air duct.

FIG. 17 shows another representation of a motor vehicle seat with heating element applied to its upper side.

DETAILED DESCRIPTION

Figure 1:
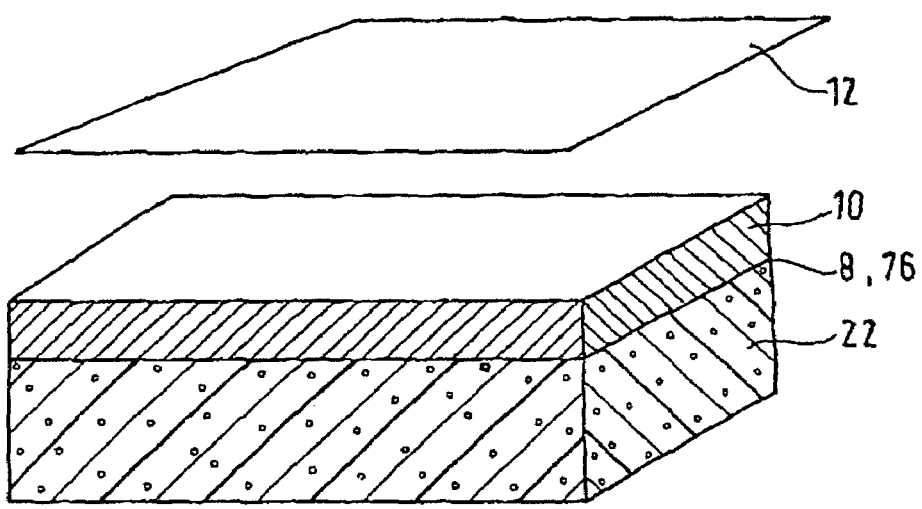
FIG. 1 shows a schematic, perspective view of a cushion core.
Figure 2:
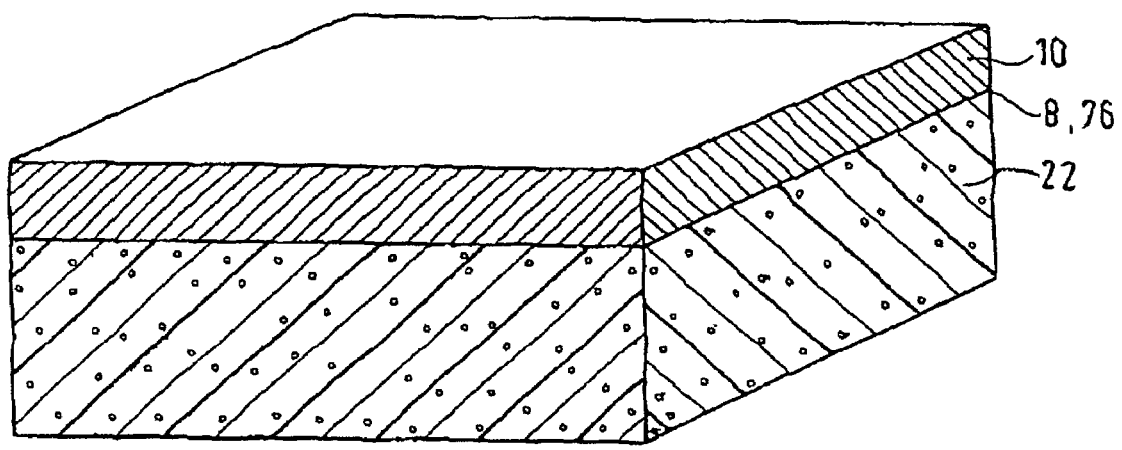
FIG. 2 shows another schematic, perspective view of a cushion core.

FIG. 1 shows the basic structure of a device according to the invention for accommodating functional elements in schematic, perspective view, using the example of a cushion. The cushion shown as the composite component comprises a bottom cushion core 22 and a base layer 8 placed thereon and joined to the cushion core, which base layer is preferably designed as a layer 76 that is impermeable to liquids. Located on the relatively thin base layer 8 is an intermediate layer 10 that is applied thereto and covered with a cover layer 12. The same situation, but without the cover layer 12, is shown once again in FIG. 2.

The cushion core 22 can be made, for example, of polyurethane foam (resilient polyurethane foam) or, for example, of rubberized hair. The intermediate layer 10 that functions as a distribution layer is composed of a spacer material which is characterized by high air permeability both transverse and perpendicular to the component surface. Air can flow through the intermediate layer 10 as illustrated in the following figures.

Figure 3:
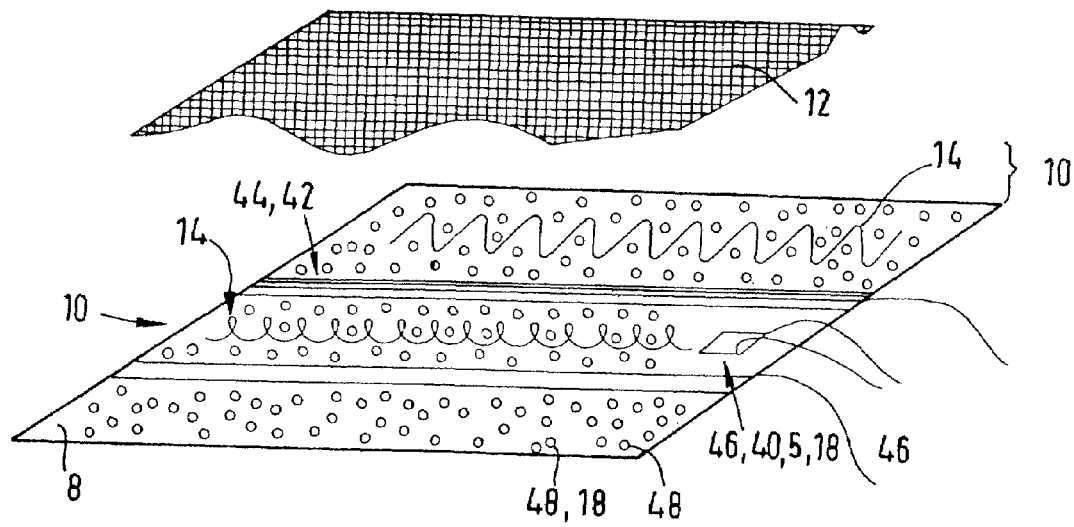
FIG. 3 shows a schematic, perspective view to illustrate various variants of a base layer.

The schematic perspective view in FIG. 3 shows different design possibilities for the base layer 8, which can have multiple strips arranged adjacent to one another. Located above the base layer 8 is the intermediate layer 10. A first strip has functional elements 18, which can take the form of fillers 48, for example. A second strip adjacent thereto encompasses a support element 14 incorporated therein, which can take the form, for example, of a coil spring or the like. In addition, a functional element 18 in the form of a sensor 40 and/or an actuator 46 can be applied to this center section of the base layer 8. The sensor 40 can be embodied as a temperature sensor, for example. The third strip has a conducting device 42 in the form of a heating wire or the like, as well as a support element 14 extending in a meandering shape. The cover layer 12 over this is merely indicated. Thus, the functional elements 18 can be arranged in the space between the base layer 8, the cover layer 12 and the support element 14.

Figure 4:
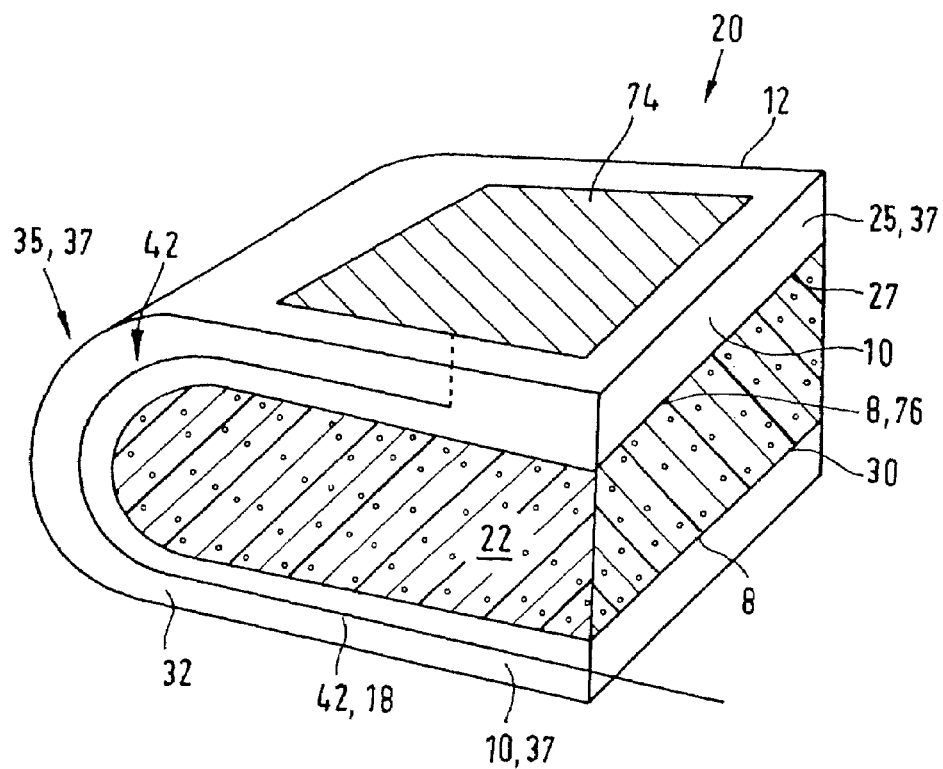
FIG. 4 shows a schematic, perspective view of a cushion of a motor vehicle seat.
Figure 5:
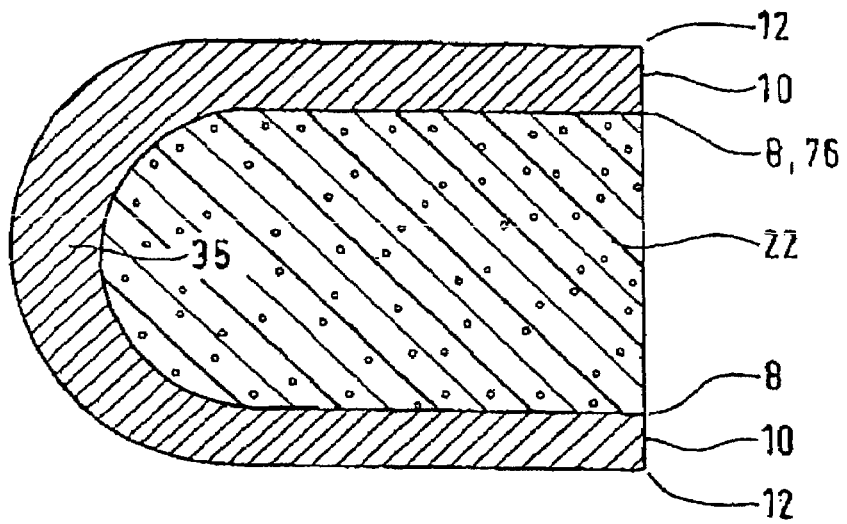
FIG. 5 shows a cross-sectional view of the motor vehicle seat from FIG. 4.

The schematic perspective view in FIG. 4 illustrates one possible construction of a vehicle seat 20. This seat has an interior cushion core 22, which is covered by a U-shaped base layer 8. The base layer 8, embodied as a liquid-impermeable layer 76, encloses the cushion core 22 on the latter's top, end face and underside. An intermediate layer 10 running along the base layer 8 has a functional element 18 in the form of a conducting device 42, which functions as an electrical connecting line to a planar heating element 74, which is located on the cover layer 12.

In the example embodiment shown, the region of the intermediate layer 10 on the top/front side 27 of the cushion core 22 functions as a hollow space 37 and/or as an upper air distribution device 25. The region of the intermediate layer 10 on the rear side 30 of the cushion core 22 likewise forms a hollow space 37 and functions as a lower air distribution device 32. The front region of the intermediate layer 10 at the face of the cushion core 22 forms a hollow space 37, which functions as a connecting device 35 between the upper air distribution device 25 and the lower air distribution device 32.

FIGS. 5 to 8 illustrate various alternative possibilities for transport of air from the cushion lower side to the cushion upper side.

FIG. 5 once again illustrates the structure of the vehicle seat 20 from FIG. 4, in a schematic cross-sectional view. An air distribution layer that extends continuously over the foam core of the cushion core 22 creates the air connection between the upper and lower sides of the cushion here. This can be achieved by a mat-like layer, which is wrapped over the front surface or rear side surface of the cushion core 22 such that the upper distribution layer 25, lower distribution layer 32 and air connection 35 are implemented in a single continuous component. The cushion core 22 is preferably rounded in such a way that the ventilating layer cannot buckle, even when a person sits in it, as such buckling could impede or disrupt the air flow.

According to another embodiment, the cushion upper side and cushion lower side can be joined by one or more air passages running perpendicular within the cushion layer 22.

Figure 6:
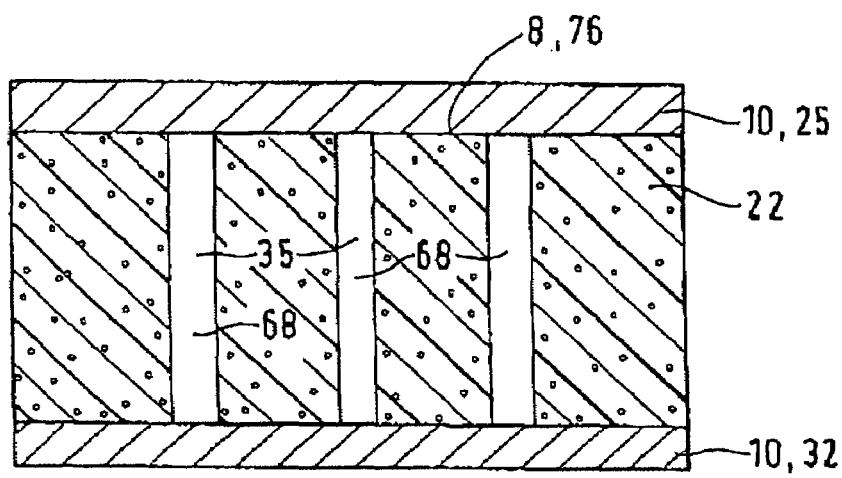
FIG. 6 shows a cross-sectional view of a first structural variant of the cushion core.

FIG. 6 illustrates, in a schematic cross-sectional view, a possible embodiment of the cushion core 22 of the vehicle seat that has vertically arranged recesses 68, each of which functions as connecting devices 35 between the lower air distribution device 32 and the upper air distribution device 25. The vertical recesses 68 in the cushion core 22 represent a connection between the lower intermediate layer 10 and the upper intermediate layer 10. The lower intermediate layer 10 functions here as the lower air distribution device 32, while the upper intermediate layer 10 functions as the upper air distribution device 25. A base layer 8 embodied as a liquid-impermeable layer 76 can be arranged between the cushion core 22 and the intermediate layer 10 in each case.

Figure 7:
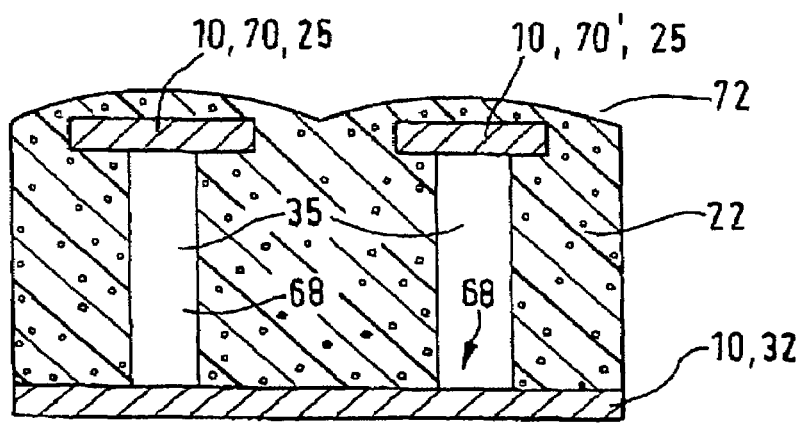
FIG. 7 shows a cross-sectional view of an alternative structural variant of the cushion core.

If the ventilated area on the cushion surface is divided into multiple sections by depressions, which are formed for example by transverse stitching in the cover, then each section must be provided with at least one air passage. FIG. 7 illustrates an alternative design of the cushion core 22 to this end. In this context, vertical recesses 68, 68' are likewise provided in the cushion core 22 and function as connecting devices 35. The upper intermediate layer 10, which functions as an upper air distributing device 25, is segmented into individual sections 70, 70' of the intermediate layer 10. Located thereon is a thin layer of the cushion core 22 which is covered by a seat cover 72. The lower intermediate layer 10, designed as a lower air distributing device 32, is embodied as a continuous volume element in the same manner as in FIG. 6.

FIG. 8 illustrates a schematic sectional view of a possible embodiment of the intermediate layer 10, which has a number of support elements 14 that are embodied as tube-like springs 50. Said springs serve as the upper air distribution device 25, as the space 38 which they enclose is hollow. Above them is located a heating element 74, which is covered by a thin upholstery layer. On top of this is the seat cover 72, which simultaneously forms the cover layer 12.

FIG. 9 shows a schematic representation of a spring 50, which functions as a support element 14. This spring 50 is wound in the shape of a spiral. FIG. 10 shows an alternative version of the spring 50, which likewise constitutes a support element 14. This spring 50 is designed in a meandering shape.

Figure 11:
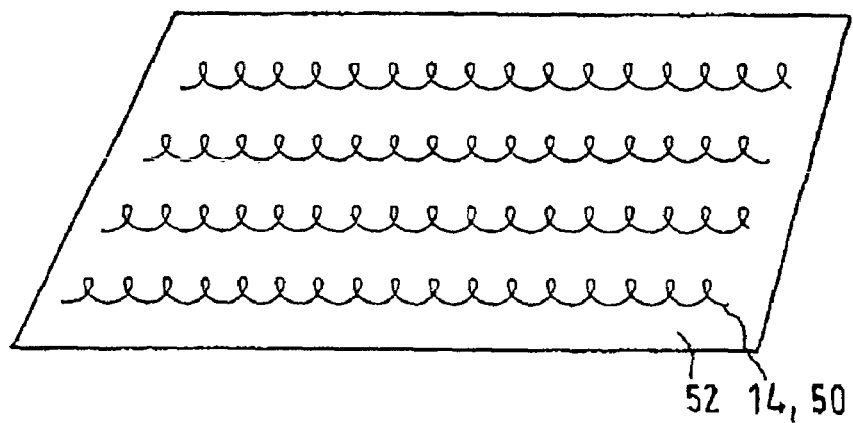
FIG. 11 shows a schematic view of a supporting layer with incorporated support elements.
Figure 12:
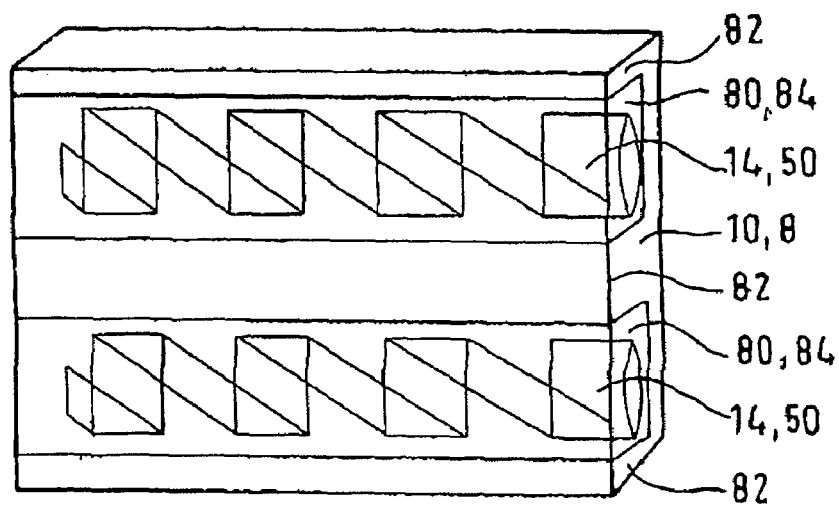
FIG. 12 shows a structural variant of an intermediate layer with recessed and raised surface regions.

FIGS. 11 and 12 show two different variants of the lower air distribution layer 32.

FIG. 11 illustrates a series of springs 50 arranged parallel and next to one another in a supporting layer 52. The coil springs 50 constitute the support elements 14 in the supporting layer 52. FIG. 11 thus illustrates a first variant embodiment of the lower air distribution layer 32 which is composed of a planar material. This results in large cross-sections for conducting and distributing air with a relatively small depth, which can typically be approximately 5 mm to 15 mm. This layer can be a coil mat that is produced by adhering the coils to the textile support medium (support layer 52). The support can advantageously face toward the foam core or toward the seat structure.

FIG. 12 illustrates a schematic perspective view of another possible embodiment of the intermediate layer 10 in which are incorporated recessed surface regions 80 that are embodied as channel-like regions 84. These regions are separated from one another by raised surface regions 82. Located within the recessed surface regions 80 are springs 50, which function individually as support elements 14. As a result, one or more channel depressions are formed on the underside of the foam, running parallel to the undersurface of the foam. Coils provide the channel depressions with support so they do not collapse when a person sits in them. The channels may run parallel to one another or extend outward in the shape of a star, from a center where the ventilating device 60 or fan is located, to the various cushion regions. The shape of the channel may be made semi-round, rectangular, or trapezoidal, as desired.

There are a number of design options for the upper air distribution layer 25 facing the passenger. Thus, for example, the layer may take the form of a structured coil mat that is produced by adhering the coils to a textile support medium. The support can face toward the foam core or toward the seat structure.

Alternatively, the layer can also be made up of one or more strata of spacer fabric. The fabric is produced by punching the desired contour of the ventilated field. The upper air distribution layer 25 can also optionally consist of a flat, formed rubberized hair body, a bristled mat or other air-permeable materials.

Another alternative design can provide that the cushion core has a structured, napped surface. An additional molded foam part with a structured surface can also be glued to the foam body. The molded foam part can be manufactured from reticulated (open-cell, air-permeable) foam. The structure can then also face the foam core. This achieves reduced show-through of the structure on the surface of the seat cover. The structuring can be produced through embossing of the foam or by material removal (milling).

Figure 13:
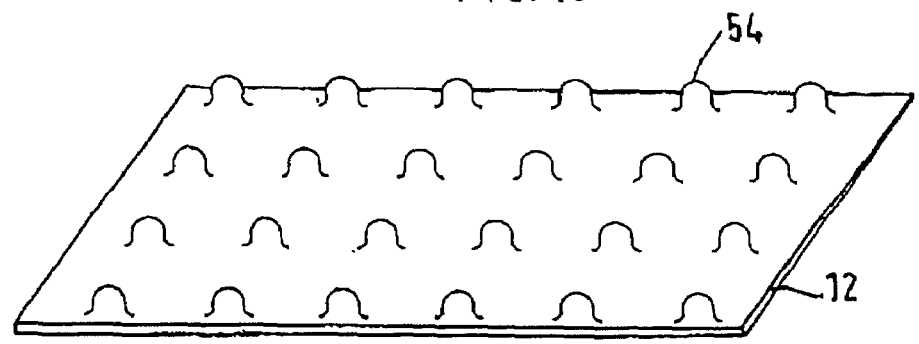
FIG. 13 shows a design for a cover layer with surface structure applied thereto.

FIG. 13 shows another possible design of the cover layer 12, which has raised surface structures 54.

Ventilation of the seat contact surface using the cushion element described above can be implemented in a number of ways.

Figure 14:
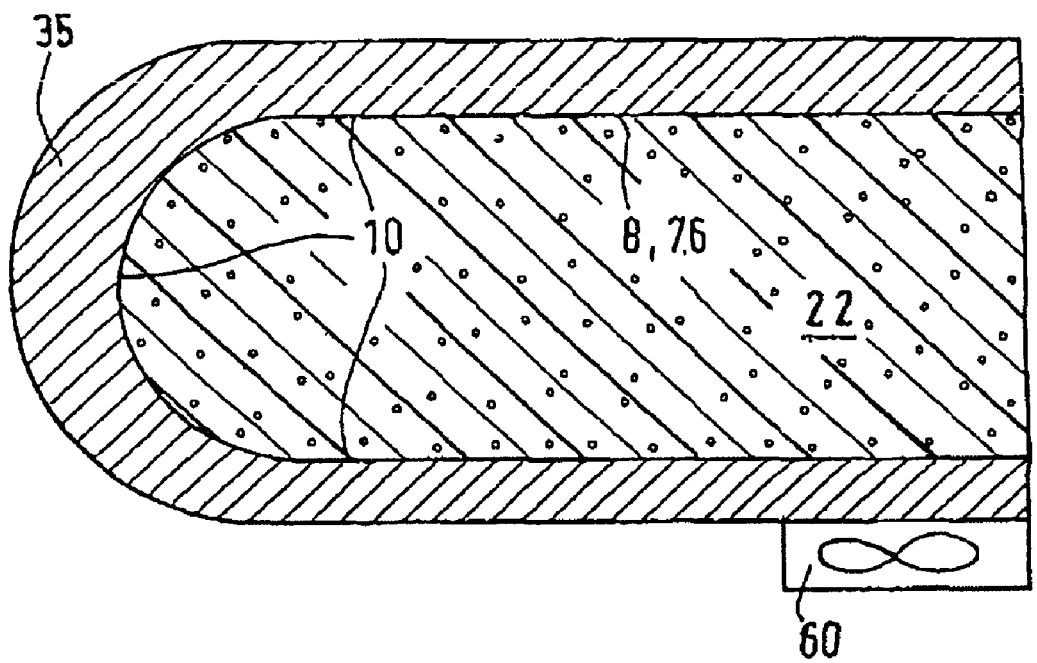
FIG. 14 shows a first variant of a motor vehicle seat with ventilating device arranged thereon.

A ventilated design of the motor vehicle seat 20 is illustrated by the schematic cross-sectional view in FIG. 14. The vehicle seat has a cushion layer 22 and an intermediate layer 10 that encloses the cushion layer on at least three sides. The base layer 8, designed as a liquid-impermeable layer 76, is located at least between the upper air distribution device 25 and the cushion layer 22. Located beneath the motor vehicle seat here is a ventilating device 60, which provides an airflow into the intermediate layer 10. The ventilating device 60 can blow air into the lower air distribution device 32, which is then conveyed through the connecting device 35 into the upper air distribution device 25. The fan can be attached to the seat structure or to the cushion part itself. The lower ventilating layer has an air intake opening for this purpose.

Figure 15:
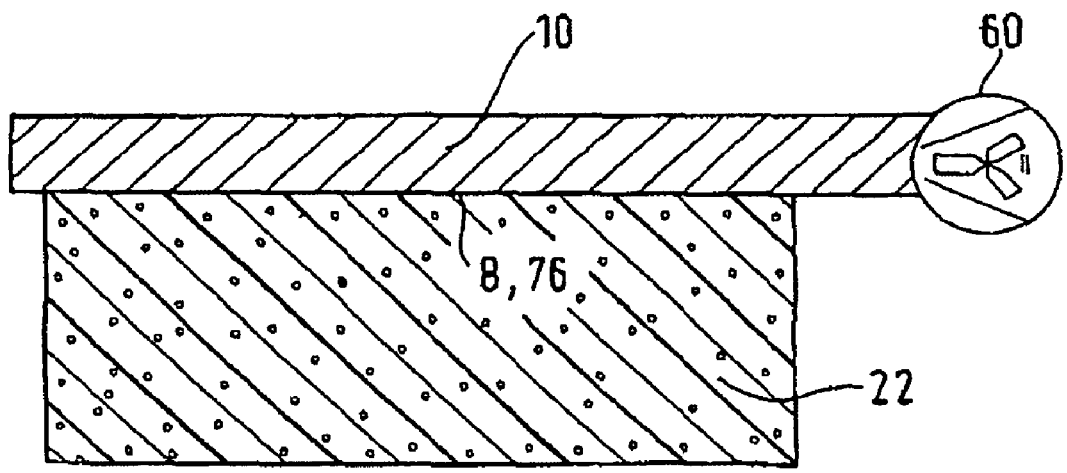
FIG. 15 shows an alternative variant of a ventilating device joined to the intermediate layer.

FIG. 15 shows another alternative embodiment of the vehicle seat in which the ventilating device 60 is arranged on a narrow side of the intermediate layer 10. In this example embodiment, the ventilating device 60 discharges into the upper air distribution device 25.

FIGS. 16 and 17 show different flow paths of the airflow introduced into the intermediate layer 10. While FIG. 16 shows a vehicle seat with no heating device, the representation in FIG. 17 has a planar heating element 74 located on the upper air distribution device 25.

In the embodiment in FIG. 16, the lower ventilation layer 32 has an air intake opening, while the upper layer 25 has a covered air outlet opening. This outlet can be installed between the backrest and seat cushion, where it can neither be seen nor felt by the seat passenger, or it can be incorporated in the backrest cover, and thus be directed at the backseat passenger. The airflow under the seat contact surface is produced through natural convection, which arises through heating of the air in the upper layer in the manner of a chimney. The heating arises from the passenger's body heat, which is transmitted to the seat cushion.

In accordance with FIG. 17, the heating of the air in the upper distribution layer 25 can be accomplished by a heating medium incorporated in the layer. The heating of the air causes a larger temperature difference with respect to the ambient air, and thus stronger convection. In addition, the warm air has a greater capacity to absorb humidity.

The heating of the air in the upper distribution layer 25 can optionally also result from the heating of the seat surface by solar radiation when the vehicle is parked. The resulting air circulation prevents the cushion core 22 from heating up excessively. In addition, the upper air distribution layer 25 has a heat insulating effect. Additional heating of the sunlit cushion core 22 would have adverse thermophysiological effects for the passenger during travel, since heat is delivered from the thermal mass of the foam and the seat structure to the body over a long period of time.

Figure 18:
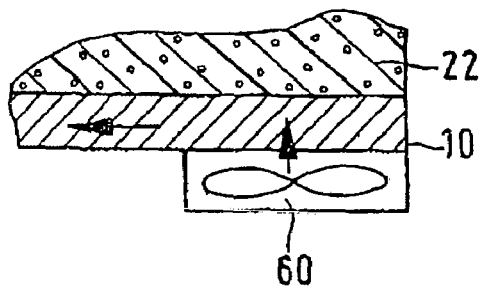
FIGS. 18-21 show various representations of coupling the ventilating device to the intermediate layer.
Figure 19:
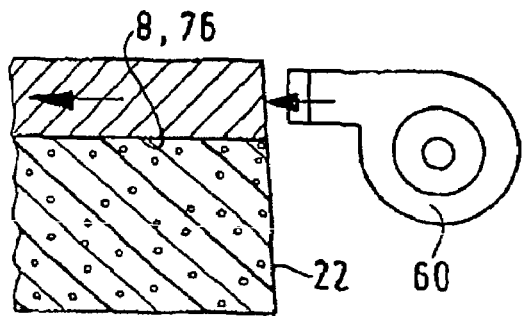
Figure 20:
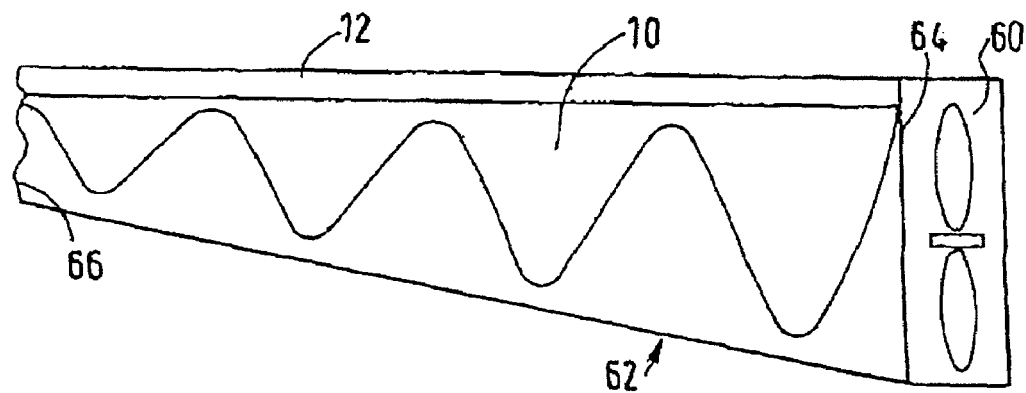

FIGS. 18, 19 and 20 each show different embodiments of the ventilating device 60 located on the motor vehicle seat. Thus FIG. 18 illustrates a ventilating device 60 embodied as an axial fan which blows the air into the intermediate layer 10 perpendicular to the planar extension of the intermediate layer. Located on the underside of the air distribution layer 32 is an air intake opening in the spacer medium. The cross-sectional area of the opening corresponds to that of the air outlet opening of the fan. The opening in the structured coil mat results from a cutout in the cover layer that is optionally supported by a frame or a grid to protect the fan rotor.

FIG. 19 shows a radial fan that blows the air through the end face into the intermediate layer 10 along the planar extension of the intermediate layer. The fan 60 is thus attached to the end face of the distribution layer. An adaptor adapts the cross-sectional shape of the fan outlet to the planar intake into the distribution layer. It is preferable for flow reasons to use a radial fan that has a narrower outlet than an axial fan has, and that deflects the air drawn in from beneath by 90 degrees when blowing it out.

Figure 21:
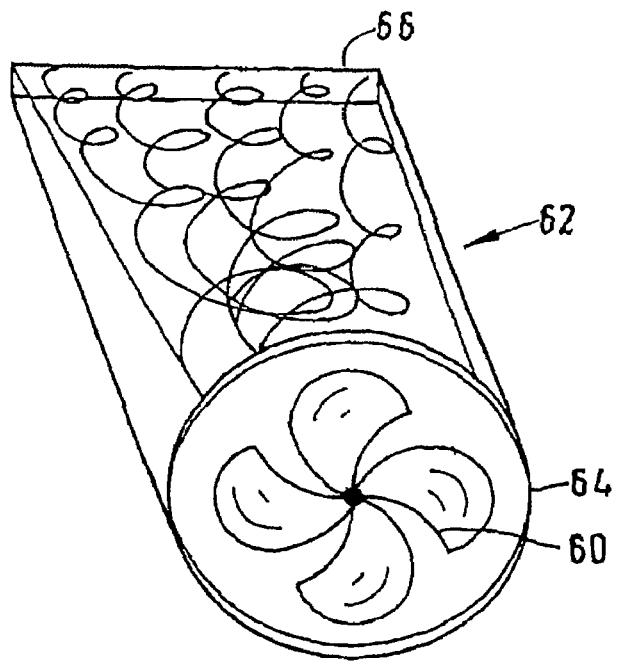

FIG. 20 illustrates a region 62 of the intermediate layer 10 which at one end 64 has a ventilating device 60 in the form of an axial fan that conveys the air through the region 62 to the other end 66 of the intermediate layer 10. FIG. 21 illustrates a region 62 of the intermediate layer 10 which at one end 64 has the ventilating device 60. The other end 66 guides the air into the entire intermediate layer 10. In the embodiment shown in FIGS. 20 and 21, the structured coil mat opens onto an enlarging connecting duct that is supported by circular coils of increasing diameter. The cross-section of the intake opening at the end of the duct corresponds to that of the fan's outlet opening. The duct can optionally also be formed by the continuation, expansion and meshing of the coils from the structured coil mat.

Figure 22:
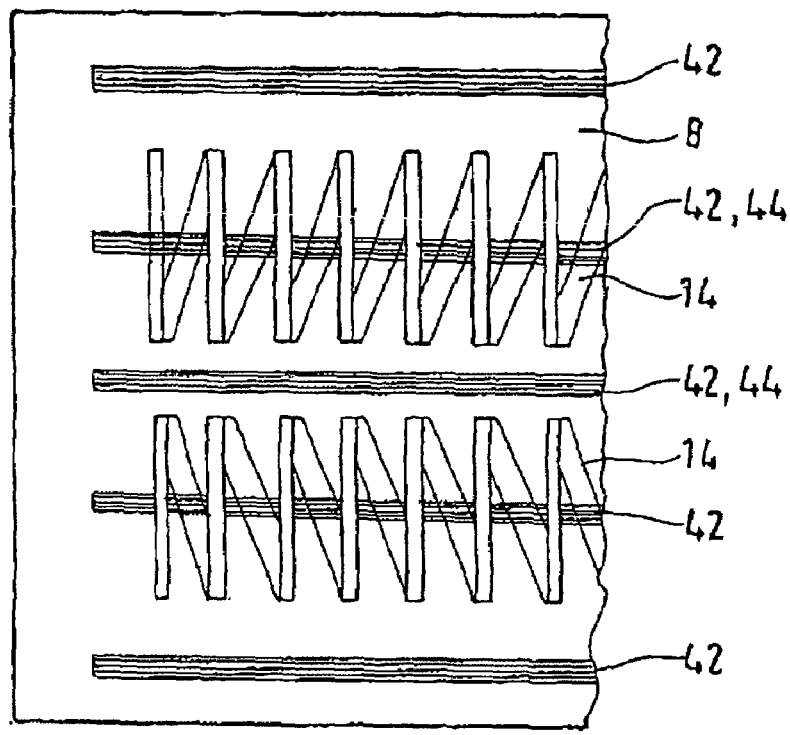
FIGS. 22 and 23 show alternative structural variations of the base layer with support elements or conductive elements applied thereto.

FIG. 22 illustrates a schematic top view of the base layer 8, the incorporated conducting devices 42 and heating conductor 44. In addition, support elements 14 are provided which hold the applicable heating conductor 44 in position.

Figure 23:
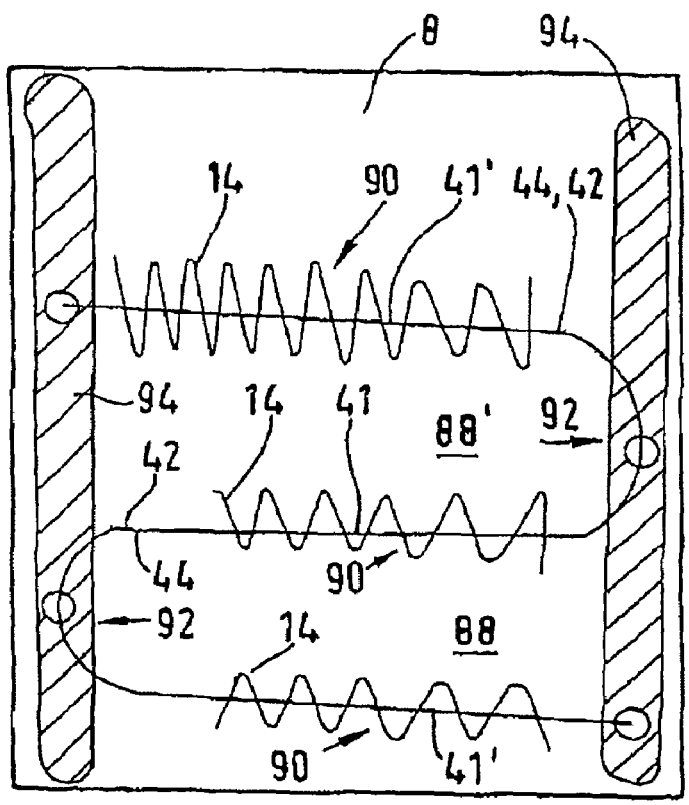

The schematic top view in FIG. 23 illustrates a heating conductor 44 that is affixed to the base layer 8. The heating conductor is laid helically on the base layer 8 in an intermediate space 90 in the intermediate layer. In this example embodiment, a number or a plurality of elongated intermediate spaces 88, 88', which are parallel to one another, are formed by the support elements 14. A conducting device 42 in the form of an insulated heating conductor 44 extends in the intermediate spaces 88, 88'. The heating conductor 44 is affixed to the base layer 8 in a transition 92 from one intermediate space 88 to the other intermediate space 88'. In the example embodiment shown, this attachment is accomplished by means of strips 94 of adhesive material that are arranged perpendicular to the intermediate spaces 88, 88'. However, provision may also be made for the strips 94 to be embodied as electrodes.

Figure 24:
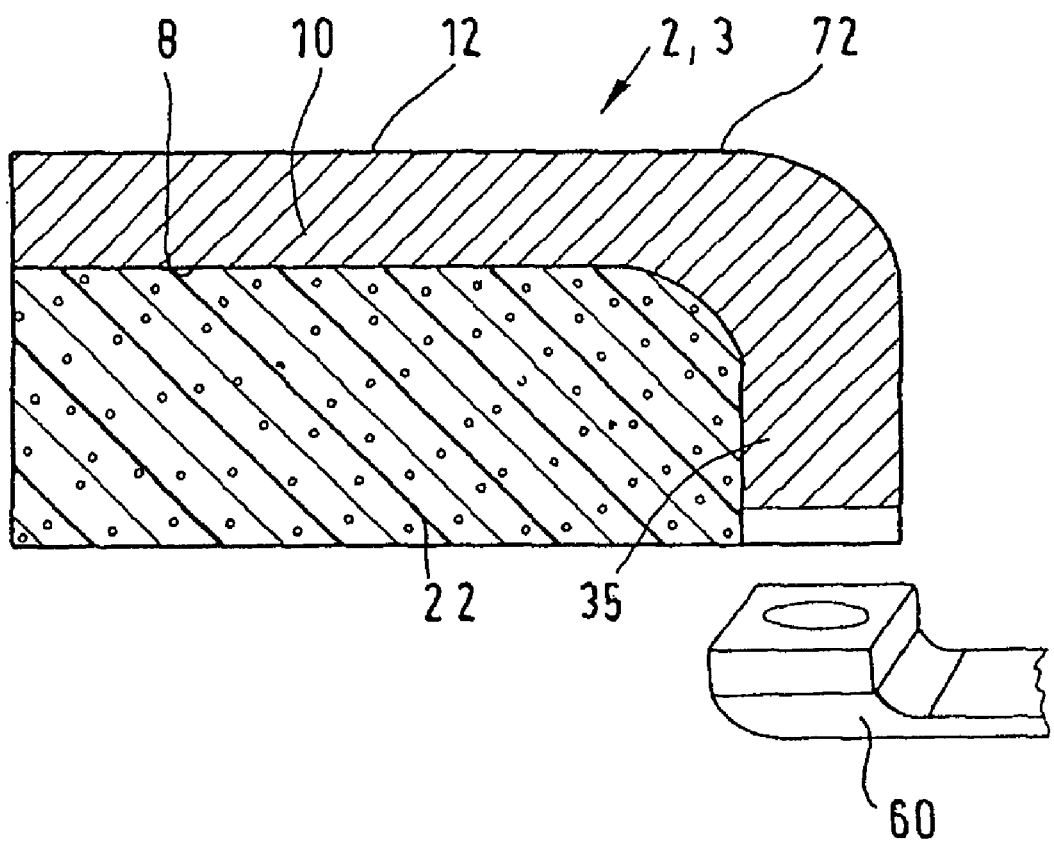
FIG. 24 shows a schematic cross-sectional representation to illustrate an alternative for coupling the ventilating device to the intermediate layer.

The schematic representation in FIG. 24 illustrates one possible connection between the ventilating device 60 and the connecting device 35 of the intermediate layer 10 that is arranged around the cushion core 22.

Figure 25:
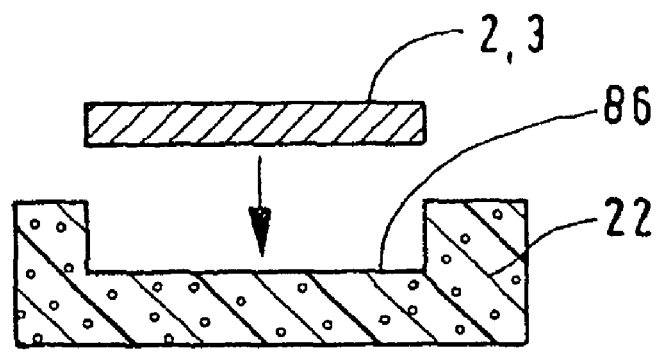
FIG. 25 shows a schematic cross-sectional representation of a motor vehicle seat with an inventive device.

Finally, FIG. 25 illustrates a climate control device 2 that can be inserted in a recess 86 of the cushion core 22.

Figure 26:
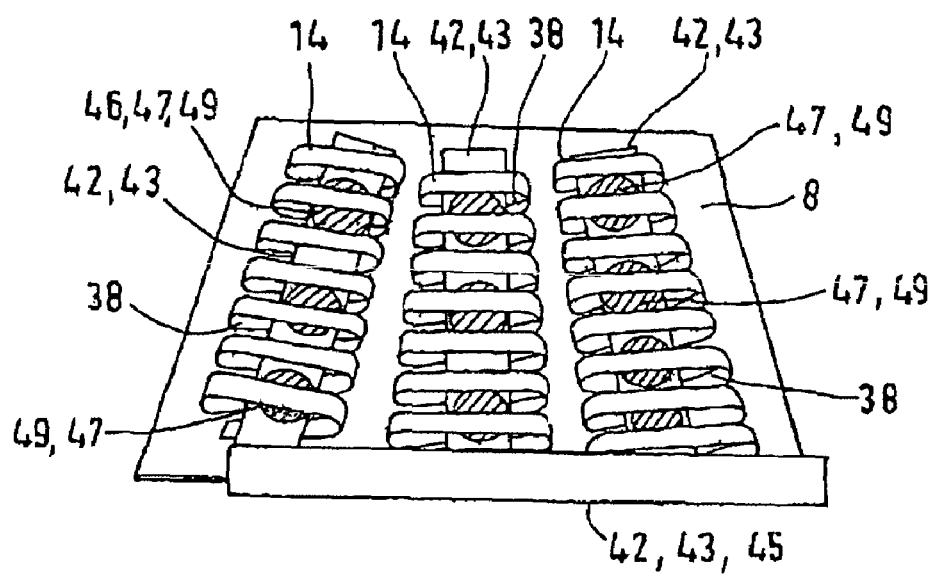
FIG. 26 shows another embodiment of the invention in perspective view.

FIG. 26 shows an especially preferred embodiment. Illustrated is a base layer 8 (alternatively, the cover layer 12), on which are arranged a plurality of support elements 14. In the present exemplary embodiment, the support elements 14 have the shape of elongated coils that are arranged approximately parallel to one another with respect to their longitudinal axes.

One electrical conductor 43 runs along the longitudinal axis of each support element 14. This conductor 43 is enclosed by the support element 14, so the conductor is well protected from external forces. The electrical conductor 43 can be a heating cable. In the present case, however, it is a flat cable, preferably with two conductors.

Figure 27:
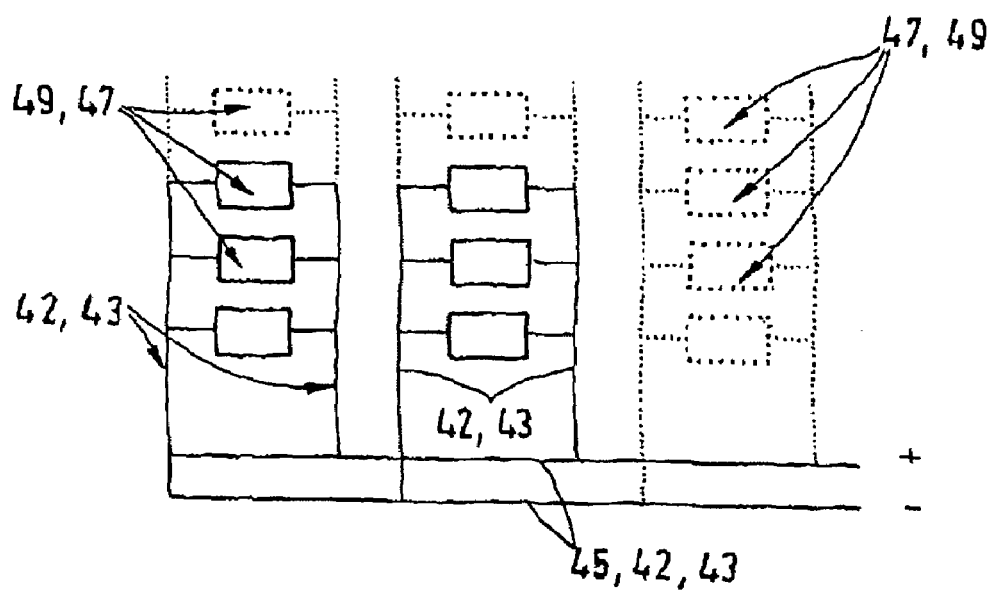
FIG. 27 shows an electrical equivalent schematic of the arrangement from FIG. 26.

Preferably at least one electric heating component 47 is arranged on each electrical conductor 43. Preferably a plurality of heating components 47, preferably at regular intervals, are attached to each electrical conductor 43. These are preferably PTC elements, e.g. of semiconductor ceramic of barium titanate. The heating components 47 of an electrical conductor 43 are preferably contacted electrically parallel to one another. FIG. 27 shows the electrical equivalent schematic of the arrangement from FIG. 26.

The plurality of electrical conductors 43 is connected to a power source through a shared bus bar 45, forming a comb-like conductor structure. The bus bar 45 runs approximately perpendicular to the electrical conductors 43 at the edge of the base layer 8 or the cover layer 12.

Figure 28:
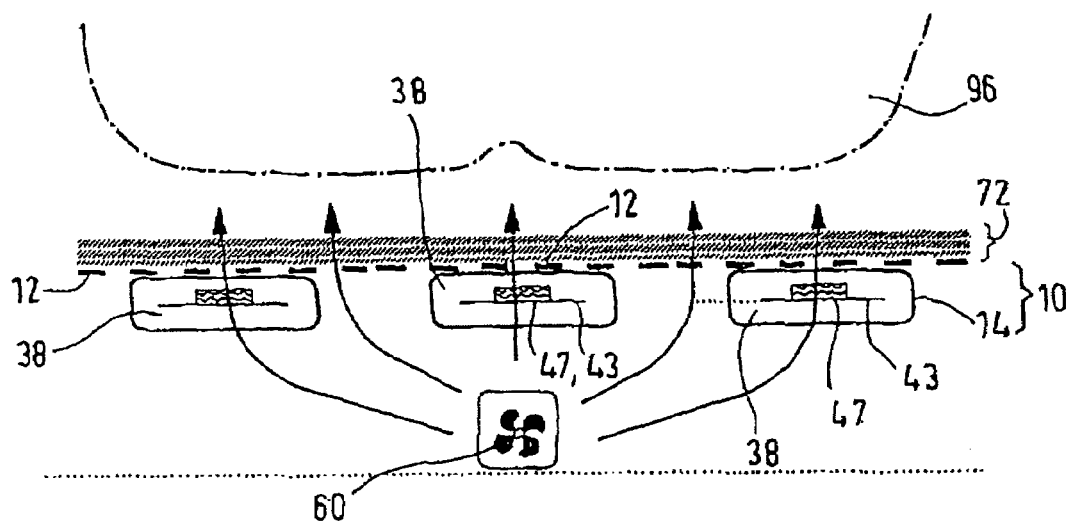
FIG. 28 shows a cross-section through a seat with an arrangement from FIG. 26.
Figure 29:
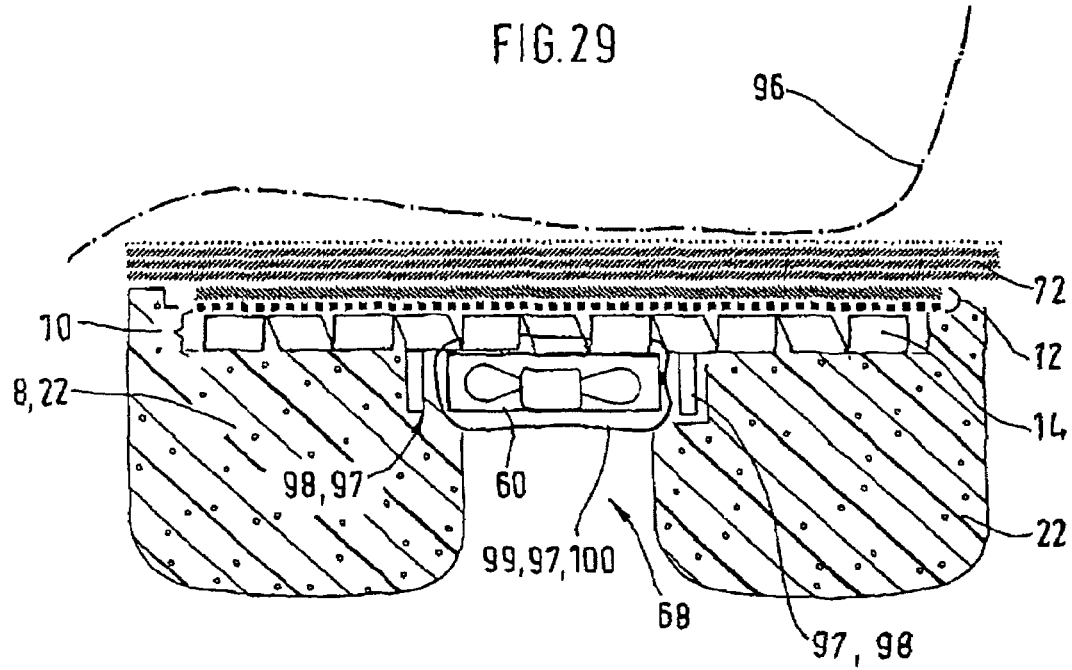
FIG. 29 shows a longitudinal section through a seat with details of attachment of the ventilating device.

FIG. 28 shows the arrangement from FIG. 26 installed in a motor vehicle seat. The cover layer 12 is arranged beneath a seat cover 72. The support elements 14 run along the cover layer 12 in the intermediate layer 10 with the electrical conductors 43 accommodated therein and the heating components 47. A fan device 60 stands in fluid-permeable connection with the intermediate layer 10.

During operation, the heating components 47 heat by means of ohmic heating. The characteristic increase in the heater resistance of PTC components with increasing temperature results in a temperature limitation or a self-regulation of the heat output of the component and thus determines the components' final temperature. The heat passes, primarily by conduction, through the air enclosed in the intermediate layer 10, and the seat cover 72 located between a passenger 96 and the heating components 47, to the body of the passenger. The air layer in the intermediate layer 10 contributes to heat distribution by convective mixing. With additional use of the ventilating device 60, air is conveyed through the intermediate layer 10 and the air-permeable seat cover 72, and produces a convective heat transport to the passenger 96. This action increases the rapid perception of system operation while simultaneously improving heat distribution.

In addition to appropriate selection of the type, number, density and size of the heating components, the control of the current level, switch-on times, and the PTC effect of the heating components can also be used to control the heat output.

In addition, it can be beneficial for the heat output to be controlled by regulation of the airflow of the ventilating device 60. Higher airflows bring about greater convective cooling of the PTC components, and thus, by lowering the resistance, to an increase in the heat output generated. The physiologically effective heat output likewise increases in a certain air volume flow region.

Moreover, provision may be made for a time delayed switch-on of the fan after a preheating phase of the PTC components. This can also contribute to an increase in the subjectively perceived response characteristics of the car seat heater. At the same time, this avoids fanning the passenger with initially cold air in the seat. High switch-on currents of the PTC components may necessitate series connection of a physical unit for current limitation (example: NTC semiconductor component) so that the vehicle's on-board network is not overloaded.

FIG. 28 shows details of an attachment of a ventilating device 60 to the intermediate layer 10. Arranged on a cushion core 22 are an intermediate layer 10, a cover layer 12, and a seat cover 72. Provided approximately in the center of the cushion core 22 is a recess 68, which penetrates the cushion core 22 from the side of the cushion core 22 facing away from a passenger 96 to the intermediate layer 10. Arranged in the recess 68 is a ventilating device 60 in order to feed air from the side of the cushion core 22 facing away from the passenger 96 to the intermediate layer 10.

An anchoring means 97 is provided to attach the ventilating device 60 to the intermediate layer 10. This anchoring means has a fastening device 100 on the ventilating device and a retaining device 96 on the intermediate layer 10.

In the present case, the fastening device 100 is a cable tie that engages a few windings of at least one support element 14 in the intermediate layer 10 in order to fasten the ventilating device 60 to the intermediate layer. This method of attachment is at the same time sturdy, cost-effective, and sufficiently yielding to mechanical loading. However, instead of a cable tie, hooks or clips would also be possible for fixing the ventilating device 60 to a support element 14 or a corresponding component.

The retaining device 98 in the present case is a short stud that is attached—preferably welded—to at least one support element 14. This stud guides the ventilating device 60 into the desired position during installation and snaps it into its final position. Instead of a stud, however, a flange or similar mechanical mounting interface may also be provided.

Preferably the anchoring means 97 also has a vibration damper 99. This damper can take the form of appropriately loose cable ties as in the example embodiment. Preferably, however, vibration absorbers made of rubber in the form of plates or pegs are used, which are preferably arranged between the ventilating device 60 and the intermediate layer 10.

Dehumidification of the seat surface can be improved by an intermediate moisture buffer in the upper spacer medium, for example in the region of the upper cover layer 12. Such dehumidification can have advantageous effects especially in the event of arrival in the vehicle of a person who perspires heavily, since moisture or water vapor incident on the seat contact surface can be rapidly absorbed by the upholstery. The heating and ventilation of the upholstery continuously empties and dehumidifies the buffer. The buffer can be introduced into the layer in a number of ways. For instance, the interstices of the coils and/or the volume enclosed by the coils can be filled with a moisture-adsorbing granulate, for example activated carbon. The surface of the coils can also be dusted with moisture-adsorbing powder. The adhesion of the powder can be ensured by such means as melting onto the coil surface or the use of an adhesive coating. The coil pad can also be provided with a moisture-absorbing nonwoven cover layer.

The air distribution layers (intermediate layers 10) must be firmly joined to the cushion core 22 in order to prevent shifting of the layers during installation of the cover (upholstering) or during use of the seat. This joining can of course be achieved in a number of ways. For instance, the distribution layer can be introduced in a foam molding process. This achieves full-area adhesion of the layer. A separator layer of film or dense textile prevents penetration of the liquid foam during the manufacturing process and keeps the channels (coil channels) open. The separator layer can optionally replace the downward-facing supporting layer of the coil mat in whole or in part.

Alternatively, the distribution layer can be introduced in the form of a pad that is inserted in recesses in the foam core. The recesses constitute a negative image of the outside shape of the pad. Slipping of the pad is prevented by the interlocking connection.

Another variant consists in that retaining mechanisms in the form of claws, hooks, or hook-and-loop closures are attached to the foam core. These retaining mechanisms are preferably fastened or foam-molded to the foam core during the foam molding process. The retaining mechanisms engage the microstructure of the distribution layer or the support elements.

The distribution layer can optionally be fastened to the foam core by an adhesive joint.

Finally, the supporting layer facing the foam surface can have a contour overlap beyond the spacer medium. The overlapping edge of the textile or film-like layer is joined to the foam core with an adhesive bond.

A molded foam part with a comfort layer in the region of the seat contact surface can be designed in a number of ways. Thus, for example, a heating medium can be area-bonded to a spacer medium. This composite covers the upper side of a molded foam core facing a passenger. The heating medium here forms the outer layer facing the surface. The comfort composite is preferably introduced during foam-molding in the manufacturing process, which can result in a stable, adhesive-free full-area join. The heating medium can optionally also be an integral component of the spacer medium.

Possibilities for the spacer medium include, in particular, a material that is relatively soft in bending and has a pronounced compression hardness and pronounced recovery properties, so that defined open spaces remain in the cushion when a passenger is present. Nonetheless, the medium must be able to adapt relatively easily to each contour in the foam and be able to transmit compressive loads to the foam without notable spreading so that the medium does not degrade passenger seating comfort.

The layer can, for example, take the form of a structured coil mat. This coil mat is produced by adhering the coils (support elements 14) to a textile support medium (support layer 52, see FIG. 13). The support can face toward the foam core or toward the seat structure. Optionally, the layer can also be made up of one or more layers of spacer fabric. The fabric can be produced by punching the desired contour of the ventilated field.

Alternatively, the layer can also consist of a flat, formed rubberized hair body, a bristled mat or other air-permeable materials.

The cushion core 22 can have a structured, napped surface. An additional molded foam part with a structured surface can also be glued to the foam body if desired. In particular, the molded foam part can be manufactured from reticulated (open-cell, air-permeable) foam. This structure can face the foam core if desired. This achieves reduced show-through of the structure on the surface of the cover. The structuring can be produced through embossing of the foam or by material removal (for example by milling).

The planar heating medium can be joined to the spacer medium by means of an adhesive layer in a laminating process. Preferably a heat-activated or superheated steam-activated adhesive nonwoven mat is used. The planar heating medium can consist of a heating conductor that is laid or glued to a planar support. It can also consist of a network of parallel carbon fibers applied to a textile support in a sewing/knitting process. The heating medium can optionally also be made of metallic coating on a support film. Finally, an alternative variant of the heating medium can comprise a conductive plastic layer. The plastic is characterized by a decrease in specific conductivity with increasing temperature (PTC). The heating current flows between two electrode layers perpendicular to the cushion surface. The heat output can thus differ regionally as a function of the removal of heat.

The loops can be affixed to the support by adhesive dots at the turning points or can be held on an adhesive strip on a projecting edge of the support.

Another alternative variant provides that the thermoplastic surface of the thermoplastic coils is melted on by the application of heat. The application of heat can be accomplished, for example; by radiation, hot air or by heating of the conductor itself. In this way, adhesive dots are created at the contact points of the conductor to the coils, and these dots provide a mechanical connection after curing of the thermoplastic.

In addition, the heating conductors can each have an insulating jacket that protects against abrasion.

The attachment of the spacer medium to the foam can be embodied in the following manner. The distribution layer can be mixed in during the foam molding process. This achieves a full-area adhesion of the layer. A separator layer of film or dense textile prevents penetration of the liquid foam during the manufacturing process and keeps the channels (coil channels) open. The separator layer can replace the upward-facing supporting layer of the coil mat in whole or in part. A projecting end of the separator layer likewise protects the lateral edges of the spacer medium. The projecting end can be wrapped around the spacer medium and fixed in place on its upper side.

A possible embodiment for a structured coil mat with filled intermediate spaces is described in detail below (see also FIGS. 11 and 12). A molded foam part with a comfort layer in the region of the seat contact surface can be designed as follows. The comfort layer is composed of a structured coil mat. The coil mat is produced by adhering the coils to a textile support medium. The support can face toward the foam core 22 or toward the seat structure. Adhesion of the coils to the support can also be accomplished by melting the bands of thermoplastic material.

The structured coil mat itself is a spacer medium that is soft in bending and has high compression hardness and excellent recovery properties, so that defined open spaces remain when a passenger is present. Nonetheless, the medium can adapt easily to each contour in the foam and can transmit compressive loads to the foam without spreading. As a result, the medium does not degrade the seating comfort of the cushion.

The open spaces in the coil mat may be filled with materials to enhance comfort. They may optionally also be used for routing the conductors and to accommodate sensors and/or actuators. The cushioning characteristics of the unfilled spacer material should be largely maintained, which is why only part of the available volume may be filled. This fill may consist of balls, granulate or flakes, for example. Possible filler materials include, for example, little balls of thermally insulating Styrofoam or polystyrene, which would achieve reduced heating of the foam core by solar radiation when the vehicle is parked. The heat stored in the cushion core has adverse thermophysiological effects on the passenger during travel. The upper layer has a thermal insulating effect in wintery conditions as well, so less body heat is conducted to the foam core of a cold vehicle seat.

The fill can also consist, for example, of moisture-adsorbing granulate, for example activated carbon, which can have the effect of improving comfort of the seat climate.

Recycled foam flakes, which provide good cushion comfort and adequate recovery properties, are also suitable as fill.

A granulate/foam flake mixture as fill makes for good cushion comfort, adequate recovery properties and improved seat climate comfort.

Finally, the fill can also consist of natural animal and/or plant fibers, which likewise can improve seat climate comfort and thermal comfort.

The open spaces in the coil mat may be used to accommodate sensors. For example, pressure sensors for so-called seat occupancy detection are suitable for this purpose. When these sensors are designed in the manner of a film, they are preferably arranged beneath the coil mat. The coil mat has the characteristic of further transmitting the pressure information downward. In this way, the sensors are protected from damage that could occur through seat use if they were installed close to the seat cover or close to the surface.

Other sensors that may be considered also include temperature sensors for seat heaters and/or climate control, moisture sensors for controlling seat climate devices, thermostats for seat heaters and/or operating switches or pressure sensors for operating seat adjustment units and other electromechanical comfort elements. The open spaces in the coil mat may optionally be used to accommodate actuators, for example for massage motors.

Of course, the open spaces in the coil mat may also be used to accommodate lines or conductors (conducting devices 42, heating conductors 44). In this way, the conductors are protected from damage during installation and when the seat is used. Moreover, the lines or conductors cannot be felt by the seat user and do not mark the upholstery surface during the course of use. Such lines and conductors that may be considered include, in particular, heating conductors, round cables to supply seat heaters and/or seat adjustment units, flat band lines to supply seat heaters and/or seat adjustment units, supply hoses for pneumatic seat adjustment units and/or hoses carrying fluids for seat heaters and/or for seat cooling devices.

A layer that extends continuously over the foam core, known as a comfort layer, creates the connection between the upper and lower sides of the cushion. This can be achieved by a component with a mat-like design (intermediate layer 10) that is wrapped over the front surface, or rear side surface, of the cushion core 22. The cushion core 22 is rounded in such a way that, even when a person sits in it, the layer cannot buckle, which could damage lines routed through the layer. Moreover, the routing of the lines is hidden in this way, so the user can neither see nor feel then (see also FIG. 4, for example).

The supporting layers for the coil medium can have the following characteristics. The cover layer can be made of a textile medium or of foam, so that show-through on the upholstery surface of the fill granulate, lines or conductors, sensors, or the coils themselves can be prevented. This cover layer may be wide-meshed or open-celled. However, the granulate pieces should not be able to penetrate the cover layer even when the seat is being used.

Moreover, the cover layer can be vapor-permeable and water-resistant in order to protect components and media located beneath this layer from the entry of liquids, while simultaneously safeguarding comfort of the seat climate.

For the cover layer, a wide variety of materials can be considered that additionally improve the cushioning characteristics of the seat and the feel of the upholstery surface. Such materials may be nonwoven fabrics, textiles, foams or films. The implementation of an adhesive joint to the coil medium can have the effect of limiting the choice.

The cover layer can also have a light-permeable film in conjunction with a perforated cover surface and a lighting medium in the seat so that illumination of the upholstery surface is possible. This lighting can be used to make visible the positions of operating controls, sensors and/or the functional state of a comfort element.

Moreover, such lighting can improve the visual quality of the seat design.

The geometric and design freedom of the coil structure facilitate optional substitution of the entire foam core. The use of multiple coil layers, large coil cross-sections and/or intermeshed coils achieves the construction of a voluminous shaped body. The processing of the surface profile can be undertaken as the final fabrication step due to the thermoplastic deformability.

The composite of upholstery cover fabric and backing cloth itself may be used as the supporting layer for the coil medium. As a result, the seat cushion as a whole, consisting of cushion core, cover and undersprings, is replaced by a single modular unit.

A climate control device for a passenger compartment of a vehicle may be provided, with a base layer 8, with a cover layer 12 facing a passenger 96 that is arranged to at least partially overlap the base layer 8, with an intermediate layer 10 that is arranged between the base layer 8 and the cover layer 12 and that has at least one support element 14 in the form of a spiral spring, which support element holds the base layer 8 and the cover layer 12 apart from one another in order to maintain a hollow space 37 between them, wherein the climate control device has at least one electrical conductor 43 which is/are arranged in the hollow space 37.

Provision can be made that the climate control device has at least one electric heating element 49 and that the electrical conductor 43 and/or the electrical heating element 49 are composed of a heating conductor 44.

Provision can be made that the electrical conductor 43 runs along at least a part of the support element 14, preferably inside and/or outside the space 3 enclosed by the coils of the support element 14.

Provision can be made that a plurality of electrical conductors 38 or conductor sections 41, 41' are provided which are electrically wired in parallel to one another and/or are routed approximately parallel to one another, and which are connected to one another through at least one common bus bar 45 and/or by alternating connection of the ends of a conductor section 41 with the respective ends of adjacent conductor sections 41'.

Provision can be made that at least one conductor 43 is equipped with at least one heating component 47, which preferably has a heating resistance with PTC characteristics, preferably with a semiconductor ceramic with barium titanate.

Provision can be made that at least one conductor 43 is equipped with a plurality of heating components 47, which preferably are connected electrically in parallel to one another.

Provision can be made that the electrical conductor 43 is composed of a flat cable and/or a flat conductor.

Provision can be made that the device has a fan device 60, which is fastened to the support element 14 by a direct or indirect anchoring means 97.

Provision can be made that the anchoring means has a retaining device 98—in particular a welded on retaining plate or a guide stud—which has on it at least one support element 14 on which the ventilating device 60 can be mounted, and also that the ventilating device 60 has a fastening device 100—in particular hooks, clips or cable ties—by means of which the ventilating device 60 can be attached to the at least one support element 14, and/or that the anchoring means 97 has at least one vibration damper 99' that damps transmission of vibrations from the fan device 60 to the support element 14, preferably in the form of rubber pegs.

Provision can be made that regulation of the heat output of the heating element 49 takes place by means of the PTC characteristics of the heating element 49 and/or the volume flow of the ventilating device 60.

The invention claimed is:

1. A device for accommodating functional elements in regions of a vehicle interior that are subject to mechanical loads comprising:
    a vehicle seat comprising a cushion core for supporting a passenger, and a climate control device, wherein the climate control device comprises an upper air distribution device at a first side of the cushion core facing the passenger to distribute air along the first side of the cushion core, a lower air distribution device at a second side facing away from the passenger to distribute air along the second side of the cushion core, and a connecting device for transferring air between the upper and lower air distribution devices, wherein each air distribution device comprises:
    a base layer;
    an intermediate layer configured to allow air distribution therethrough;
    a cover layer, the layers being arranged so as to at least partially overlap one another, and wherein the intermediate layer comprises at least one support element for the transmission of mechanical loads between the base layer and cover layer and a textile support medium, said at least one support element adhered to said textile support medium and preserving air distribution through said intermediate layer when said mechanical loads are present, said at least one support element comprising a plurality of elongated coils made from a substantially planar band of plastic material, each of the plurality of elongated coils arranged approximately parallel to each other with respect to their longitudinal axes and parallel to the intermediate layer; and
    electrical functional elements arranged in a space between the base layer and the cover layer.

2. A device according to claim 1 wherein each of the upper air distribution device, lower air distribution device and connecting device include an elongated hollow space accommodating at least a portion of the intermediate layer and in whose air-conducting cross-section, at least one support element is provided.

3. A device according to claim 2 wherein the connecting device comprises at least one recess in the cushion core connected to the intermediate layer of the upper air distribution device or the intermediate layer of the lower air distribution device so as to permit the passage of air.

4. A device according to claim 3 wherein at least a portion of the intermediate layer is routed around the cushion core at a side thereof, from the first side to the second side, and wherein a conducting device is accommodated in said portion.

5. A device according to claim 1 wherein the functional element is a sensor for detecting pressure or temperature, the sensor being arranged beneath the support element.

6. A device according to claim 1 further comprising at least one heating component comprises a PTC element.

7. A device according to claim 1 wherein the connecting device comprises at least one recess in the cushion core connected to the intermediate layer of the upper air distribution device or the intermediate layer of the lower air distribution device so as to permit the passage of air.

8. A device according to claim 7 comprising at least one heating conductor arranged in at least one intermediate space between at least two support elements in the intermediate layer.

9. A device according to claim 1 wherein at least a portion of the intermediate layer is routed around the cushion core at a side thereof, from the first side to the second side, and wherein a conducting device is accommodated in said portion.

10. A device according to claim 1 wherein the cushion core comprises a plurality of recesses which connect a plurality of individual sections of the intermediate layer arranged on the first side of the cushion core to the intermediate layer arranged on the second side of the cushion core.

11. A device according to claim 10 wherein the plurality of sections are separated from one another and spaced apart.

12. A device according to claim 1 comprising an essentially liquid-impermeable layer arranged on a side of the intermediate layer facing the cushion core.

13. A device according to claim 12 wherein the essentially liquid-impermeable layer comprises the same material as the cushion core.

14. A device according to claim 1 comprising at least one heating conductor arranged in at least one intermediate space between at least two support elements in the intermediate layer.

15. A device according to claim 1 comprising a plurality of elongated intermediate spaces formed by the support elements, and wherein at least one heating conductor is arranged in at least two such intermediate spaces.

16. A device according to claim 1 comprising a plurality of elongated intermediate spaces formed by the support elements, and wherein at least one heating conductor is fixed to the base layer or cover layer at a transition from one intermediate space to the other intermediate space.

17. A device according to claim 16 wherein the at least one heating element is fixed by an adhesive strip arranged substantially perpendicular to the intermediate spaces.

18. A device according to claim 1 wherein said at least one support element maintains a hollow space in said intermediate layer.

* * * * *